United States Patent [19]

Gingrich et al.

[11] Patent Number: 5,486,594

[45] Date of Patent: Jan. 23, 1996

[54] POLYKETONE POLYMERS AS NYLON TOUGHNERS

[75] Inventors: Randall P. Gingrich, Houston; Michelle Londa, Sugar Land; John E. Flood, Houston, all of Tex.

[73] Assignee: Shell Oil Company, Houston, Tex.

[21] Appl. No.: 273,552

[22] Filed: Jul. 11, 1994

[51] Int. Cl.⁶ .................................................... C08G 79/02
[52] U.S. Cl. .......................... 528/392; 525/211; 525/285; 525/420; 525/421; 525/426; 525/539; 528/322; 528/480; 528/491; 528/493
[58] Field of Search ..................................... 525/211, 285, 525/420, 421, 426, 539; 528/392, 322, 480, 491, 493

[56] References Cited

U.S. PATENT DOCUMENTS

| | | | |
|---|---|---|---|
| 4,839,437 | 6/1989 | Gergen et al. | 525/426 |
| 4,960,838 | 10/1990 | Gergen et al. | 525/426 |
| 5,084,518 | 1/1992 | George et al. | 525/184 |

*Primary Examiner*—Shelley A. Dodson

[57] ABSTRACT

It is disclosed a toughened polyamide comprising a polyamide, such as Nylon 6, and a minor amount of a linear alternating polymer of carbon monoxide and at least one or more ethylenically unsaturated hydrocarbon. The toughened polyamide has and exhibits improved properties such as Notched Izod strength and flexural modulus and can be used in the manufacture of articles suitable in many applications.

3 Claims, No Drawings

POLYKETONE POLYMERS AS NYLON TOUGHNERS

BACKGROUND OF THE INVENTION

Polyamides are well known in the art and are used in a wide variety of applications. In some of these applications, the polyamides are used without the need for significant modifications; while in other applications, such as appliance and tool housings, it is desired that the polyamides be modified. Such modification can be accomplished by the addition of additives, or by blending the polymer with another polymeric material.

A well known example of polyamides which has been modified is Toughened Nylon 6. The tougheners in Toughened Nylon 6 are usually EPDM rubbers or acrylic acid copolymers. Both of these materials add to the cost, and in the case of EPDM rubber requires some prior modification to its addition to Nylon 6.

It is desirable to reduce the cost of Toughened Nylon 6 by reducing the cost of the toughener and by simplifying the process of adding the toughener to the Nylon. This can be accomplished by using a material that is less costly than the currently used tougheners, and which is easier to process.

Polyketone polymers because of their unique combination of properties have been discovered as an alternative toughener for polyamides. The polyketone polymers improve the dimensional stability of the polyamides, and are easy to process with the polyamide.

SUMMARY OF THE INVENTION

It is an object of the invention to provide an economically attractive toughened polyamide.

It is a further object of the invention to provide a toughened polyamide having and exhibiting improved properties, such as reduced water uptake, improved chemical resistance, and improved toughness.

It is now provided a novel toughened polyamide comprising the polyamide and a linear alternating polymer of carbon monoxide and at least one ethylenically unsaturated hydrocarbon. The novel toughened polyamide comprises from about 5 to 25 wt %, preferably from 15 to 20 wt % polyketone polymer.

DETAILED DESCRIPTION OF THE INVENTION

Generally speaking, the materials useful in the practice of this invention include a linear alternating polymer of carbon monoxide and at least one ethylenically unsaturated hydrocarbon (sometimes simply referred to as a polyketone polymer), and a polyamide such as nylon 6, nylon 11 or nylon 12. Other common polymer additives, for instance, fillers, extenders, other lubricants, pigments, plasticizers, and other polymeric materials can be added to the compositions to improve or otherwise alter the properties of the blend.

Polyketone polymer is well known in the art, and is further disclosed as follows.

The polyketone polymers which are employed as the minor component of the inventive polymer blend are of a linear alternating structure and contain substantially one molecule of carbon monoxide for each molecule of ethylenically unsaturated hydrocarbon. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the minor polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

where G is the moiety of ethylenically unsaturated hydrocarbon of at least three carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the $-[CO-(CH_2-CH_2)]-$ units and the $-CO-(G)-$ units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers on the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, of from about 0.5 dl/g to about 10 dl/g, more frequently of from about 0.8 dl/g to about 4 dl/g.

A preferred method for the production of the polyketone polymers is illustrated by U.S. Pat. No. 4,843,144 which is herein incorporated by reference.

Nylon is defined as Nylon x which includes nylon 6, nylon 11, nylon 12 and is different from nylon xy which includes nylon 6,6, nylon 4,6, etc. The end groups for nylon x are believed to be COOH and NH$_3$, while the end groups for nylon xy are believed to be primarily NH$_3$. It is believed that the end groups have a significant effect on the blend properties with polyketone. Nylon xy polymers are believed to form crosslinks with polyketone while nylon x polymer are believed to form graft copolymers with polyketone.

The polyamide usable herein is well known in the art and embraces those crystalline or semicrystalline compositions having a molecular weight of at least 5000 and which are commonly referred to as nylons. The polyamide usable herein can be produced by condensation of equimolar amounts of a saturated dicarboxylic acid containing from 4 to 14 carbon atoms. Excess diamine can be employed to provide an excess of amine end groups over carboxyl end groups in the polyamide. Examples of preferred polyamides usable herein include nylon 6, polyhexamethylene adipamide, nylon 11 and nylon 12. The polyamides produced by ring opening of lactams, i.e., polycaprolactam, polylauric lactam, poly-11-aminoundecanoic acid, bis(paraaminocyclohexyl) methane dodecanoamide, are contemplated as usable herein. Polyamides usable herein include one which are linear with a melting point in excess of 160° C.

The inventions are further illustrated by the following non-limiting examples.

EXAMPLES 1–12

A sample of the inventive toughened polyamide was made as a pellet/pellet blend with polyketone polymer, and various polyamide polymers. The samples were made by using a Bertsorff (or Haake) twin screw extruder. The samples were then injection molded using a family mold. The samples varied in the amounts of components used. These variations are shown in Table 1 which lists the samples and their compositions.

The samples were then tested (dry as molded). The test results are also shown in Table 1.

The blends of Examples 10–12 indicate that when polyketone polymer is the major component, blending with inventive amounts of nylon X, such as Nylon 6, does not positively affect the Notched Izod of the polyketone polymer. Thus a reverse roles for these polymers although apparent was not obtained.

While this invention has been described in detail for the purpose of illustration, it is not to be construed as limited thereby but is intended to cover all changes and modifications within the spirit and scope thereof.

What is claimed is:

1. A toughened polyamide composition comprising polyamide selected from the group consisting of Nylon 6, Nylon 11, and Nylon 12 and a toughener comprising of between about 15 and 20% wt of an alternating polymer of a carbon monoxide and at least one or more ethylenically unsaturated hydrocarbons (based on total weight of said composition).

TABLE 1

Mechanical Properties for Neat Polymers and Blends

| Example Number | Polyketone (wt %) | Nylon 6 Zytel 211 (wt %) | Nylon 66 Zytel 101 (wt %) | Notched Izod @ Room Temp (ft-lb/in)* | 1% sec Flexural Modulus (kpsi) | Stress @ Yield (kpsi) | Elongation @ break (%) |
|---|---|---|---|---|---|---|---|
| 1 | 2 | 98 | — | 1.0 | 173 | 7.4 | 480 |
| 2 | 5 | 95 | — | 2.8 | 166 | 7.6 | 390 |
| 3 | 10 | 90 | — | 1.1 | 200 | 8 | 390 |
| 4 | 15 | 85 | — | 28.5 | 160 | no yield | 260 |
| 5 | 20 | 80 | — | 29 | 118 | no yield | 330 |
| 6 | 20 | — | 80 | 1.5 | 363 | 9.4 | 140 |
| 7 | 90 | 10 | — | 2.7 | 287 | 8.9 | 330 |
| 8 | 80 | 20 | — | 3.4 | 279 | 8.8 | 290 |
| 9 | 70 | 30 | — | 3.7 | 294 | 8.8 | 570 |

*All Izod testing was done on a ⅛ inch thick sample at room temperature.

In Table 1, in Examples 1, 2, and 3, the amount of polyketone polymer in the blend is 2,5, and 10 weight percent respectively. For these samples, the Notched Izod values (2.8 maximum) indicates that impact toughening is not occurring. For Examples 4 and 5 which contain 15 and 20 wt % polyketone polymer, the Notched Izod values of greater than 28 ft-lb/in is significantly higher than that of either neat polyketone polymer or of neat Nylon 6.

Example 9 is a blend of Nylon 6,6 with 20 wt % of polyketone polymer. Unlike the blend of Example 8, the Notched Izod of Example's 9 blend at 1.5 ft-lb/in is less than that of Example's 8 blend, which is of the invention. This demonstrates that unlike Nylon 6, Nylon 6,6 is not toughened by blending with polyketone polymer.

2. A toughened polymer composition comprising from about 80 to 85 weight percent of Nylon 6, and from about 15 to 20 weight percent of a linear alternating polymer of carbon monoxide and at least one ethylenically unsaturated hydrocarbon.

3. A shaped article of manufacture produced from a toughened polyamide composition comprising polyamide selected from the group consisting of Nylon 6, Nylon 11, and Nylon 12 and a tougher comprising between about 15 and 20% wt of and alternating polymer of carbon monoxide and at least one or more ethylenically unsaturated hydrocarbons (based on total weight of said composition).

* * * * *